United States Patent [19]

Sugimoto et al.

[11] Patent Number: 5,055,546
[45] Date of Patent: Oct. 8, 1991

[54] PROCESS FOR PRODUCING AROMATIC POLYESTERS

[75] Inventors: Hiroaki Sugimoto; Yoshitaka Ohbe, both of Tsukuba; Kazuo Hayatsu, Ibaraki, all of Japan

[73] Assignee: Sumitomo Chemical Company, Ltd., Osaka, Japan

[21] Appl. No.: 429,041

[22] Filed: Oct. 30, 1989

[30] Foreign Application Priority Data

Nov. 4, 1988 [JP] Japan .................. 63-279937

[51] Int. Cl.$^5$ .................. C08G 63/02; C08G 63/18
[52] U.S. Cl. .................. 528/193; 528/176; 528/190; 528/194; 528/271; 528/292
[58] Field of Search .............. 528/176, 190, 193, 194, 528/271, 272

[56] References Cited

U.S. PATENT DOCUMENTS

| | | | |
|---|---|---|---|
| 4,219,629 | 8/1980 | Storm | 525/167 |
| 4,311,823 | 1/1982 | Imai et al. | 528/181 |
| 4,429,100 | 1/1984 | Charbonneau et al. | 528/193 |
| 4,429,105 | 1/1984 | Charbonneau et al. | 528/207 |
| 4,529,565 | 7/1985 | Kasatani et al. | 528/190 |
| 4,664,972 | 5/1987 | Connolly | 528/193 |
| 4,684,712 | 8/1987 | Ueno et al. | 528/176 |
| 4,719,280 | 1/1988 | Irwin | 528/176 |
| 4,731,432 | 3/1988 | Portugall | 528/190 |
| 4,746,566 | 5/1988 | Connolly | 528/190 |

FOREIGN PATENT DOCUMENTS

| | | |
|---|---|---|
| 62-265341 | 11/1987 | Japan . |
| 63-122730 | 5/1988 | Japan . |
| 63-154734 | 6/1988 | Japan . |
| 63-186760 | 8/1988 | Japan . |
| 63-210127 | 8/1988 | Japan . |
| 63-264628 | 11/1988 | Japan . |

*Primary Examiner*—Harold D. Anderson
*Assistant Examiner*—T. Mosley
*Attorney, Agent, or Firm*—Stevens, Davis, Miller & Mosher

[57] ABSTRACT

An aromatic polyester superior in heat resistance and melt-moldability is obtained by carrying out the polycondensation reaction with Component A consisting of at least one compound having the formula,

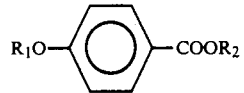

wherein $R_1$ is hydrogen, formyl, acetyl, propionyl or benzoyl, and $R_2$ is hydrogen, a $C_1$-$C_6$ alkyl or a $C_6$-$C_{18}$ aryl, or a mixture containing not less than 50% by mole of said compound, Component B consisting of at least one compound having any one of the formulas,

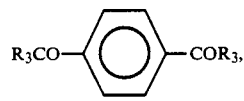

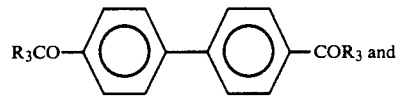

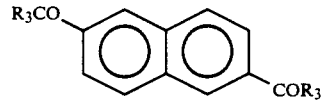

wherein $R_3$ is hydroxyl, a $C_1$-$C_6$ alkyloxy, a $C_6$-$C_{18}$ aryloxy or halogen, or a mixture containing not less than 50% by mole of said compound, and Component C consisting of at least one compound having the formula,

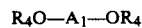

wherein $A_1$ is a divalent aromatic residue, and $R_4$ is hydrogen, acetyl, propionyl or benzoyl in a reaction vessel at a temperature of 270° C. to 380° C. until the flow temperature of the produced aromatic polyester reaches a temperature of 240° C. or higher.

The aromatic polyester obtained by the process of the present invention can be used molded into various forms such as fiber, film, etc. In addition, compositions comprising this aromatic polyester and fillers can be used in machine parts, electric and electronic parts and automobile parts because of their excellent mechanical properties, electric properties, chemical resistance and oil resistance.

7 Claims, No Drawings

PROCESS FOR PRODUCING AROMATIC POLYESTERS

The present invention relates to a process for producing an aromatic polyester having an excellent heat resistance and good melt-moldability.

It has long been tried in various ways to obtain a heat-resistant polyester. Among the trials, the aromatic polyesters having a repeating structural unit of

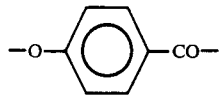

obtained by the polycondensation of p-hydroxybenzoic acid, for example Ekono® E-101 (a product of Sumitomo Chemical Co., Ltd.), are known to be successful. They are highly crystalline and so much superior in the thermal stability as not to decompose even at 300° C. at all (JP-B-46-6,796). Also, there are known polyesters obtained by polycondensation of an aromatic dicarboxylic acid, a diol and an oxy acid, for example, aromatic polyesters obtained by polycondensation of terephthalic acid, hydroquinone and p-hydroxybenzoic acid (JP-B-47-47,870). These polymers also involve liquid-crystal polymers which are recently attracting attention. The liquid-crystal polymers refer to those having a property to form liquid crystals in the molten state and be highly oriented toward the flow direction at the time of molding.

Any of these aromatic polyesters is highly heat resistant due to its high crystallinity. However, it has a poor melt-moldability, which limits the application. Modifying the aromatic polyester with one or more copolymerizable monomers while keeping the main chain unchanged facilitates the melt-molding. In this case, it is a matter of course that the composition of the constituents of copolymerization should be taken into account. Further, in carrying out the copolymerization, there have been made various trials to alter the method, the order of addition of constituents or the reaction conditions, or produce a precursor in advance without changing the composition. However, these trials have not been successful, and in addition, they are disadvantageous in cost factor in many cases.

In recognition of the situation, an object of the present invention is to provide a process for stably producing a heat resistant aromatic polyester having a uniformity and a good moldability, particularly a good melt-moldability, and giving molded products of good mechanical properties.

According to the present invention, there is provided a process for producing an aromatic polyester which comprises (1) charging the following Components to a vessel,
(A) 30 to 80% by mole of Component A consisting of at least one compound having the formula,

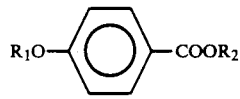

wherein $R_1$ is hydrogen, formyl, acetyl, propionyl or benzoyl, and $R_2$ is hydrogen, a $C_1$–$C_6$ alkyl or a $C_6$–$C_{18}$ aryl, or a mixture of not less than 50% by mole of at least one compound having the formula,

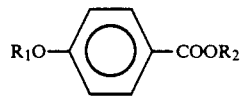

wherein $R_1$ and $R_2$ have the same meanings as defined above, and less than 50% by mole of at least one compound having any one of the formulas,

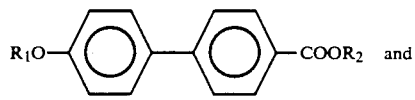

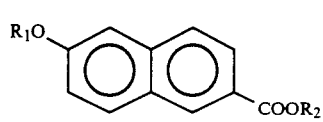

wherein $R_1$ and $R_2$ have the same meanings as defined above, (B) 10 to 35% by mole of Component (B) consisting of at least one compound having any one of the formulas,

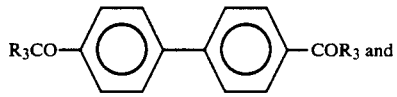

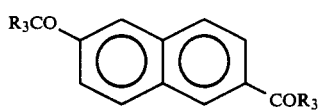

wherein $R_3$ is hydroxyl, a $C_1$–$C_6$ alkyloxy, a $C_6$–$C_{18}$ aryloxy or halogen, or a mixture of not less than 50% by mole of at least one compound having any one of the formulas,

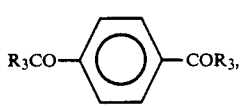

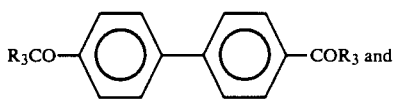

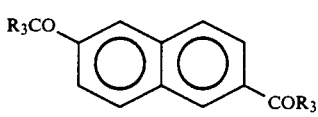

wherein $R_3$ has the same meaning as defined above, and less than 50% by mole of at least one compound having the formula,

wherein Ar is a divalent aromatic residue, and $R_3$ has the same meaning as defined above, and (C) Component (C) consisting of at least one compound having the formula,

wherein $A_1$ is a divalent aromatic residue, and $R_4$ is hydrogen, acetyl, propionyl or benzoyl, the molar ratio of Component (B) to Component (C) being 102–108:100, and (2) carrying out polycondensation reaction in the vessel at a temperature of 270° to 380° C. until the flow temperature of the produced aromatic polyester reaches a temperature of 240° C. or higher.

The aromatic polyesters obtained by the polycondensation process are characterized in that they are crystalline and have desirable mechanical properties, chemical resistance and heat resistance. Further, some of these polyesters show anisotropy at a molten state and a good melt-moldability. A preferred amounts charged of these Components (A) and (B) are 40 to 70 mole% and 15 to 30 mole%, respectively. A preferable molar ratio of (B) to (C) is 103:100 to 106:100. More preferably, said amounts charged are 49 to 64 mole% and 18 to 27 mole%, and said molar ratio of (B) to (C) is 104:100 to 106:100, respectively.

When the amount charged of Component (A) exceeds 80 mole%, the resulting aromatic polyester, when heated, contains unmolten portions in many cases, so that its melt-processability becomes markedly poor. When the amount charged is less than 30 mole%, the resulting aromatic polyester is less crystalline, which is not desired. When the content of

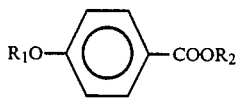

included in Component (A) is less than 50 mole%, the aromatic polyester becomes less crystalline, so that such the content is not preferred.

When the amount charged of Component (B) is 10 to 35 mole%, the aromatic polyester obtained exhibits well-balanced characteristics.

When the molar ratio of Components (B) to (C) is less than 102:100, the heat resistance (heat distortion temperature), mechanical strength and whiteness of the molded product are poor. When the molar ratio exceeds 108:100, the molded product obtained is poor in the heat resistance, and particularly poor in the mechanical strength and whiteness, there being a case the whiteness does not reach 70. Such the molar ratios are not therefore preferred.

Specific examples of the compounds included in Component (A) are p-hydroxybenzoic acid, p-formyloxybenzoic acid, p-acetoxybenzoic acid, p-propionyloxybenzoic acid, methyl p-hydroxybenzoate, propyl p-hydroxybenzoate, phenyl p-hydroxybenzoate, benzyl p-hydroxybenzoate, methyl p-acetoxybenzoate, 2-hydroxy-6-naphthoic acid, 2-acetoxy-6-naphthoic acid, methyl 2-hydroxy-6-naphthoate, phen 2-hydroxy-6-naphthoate, methyl 2-acetoxy-6-naphthoate, etc. Of these, preferred are p-hydroxybenzoic acid and its ester-forming derivatives, and more preferred are p-hydroxybenzoic acid, p-acetoxybenzoic acid and p-(4-acetoxyphenyl)benzoic acid.

Specific examples of the compounds included in Component (B) are terephthalic acid, isophthalic acid, 4,4'-dicarboxybiphenyl, 1,2-bis(4-carboxyphenoxy)ethane, 2,6-dicarboxynaphthalene, 1,4-dicarboxynaphthalene, 1,5-dicarboxynaphthalene, dimethyl terephthalate, dimethyl isophthalate, diphenyl terephthalate, diphenyl isophthalate, terephthalic acid dichloride, isophthalic acid dichloride, 4,4'-dimethoxycarboxylbiphenyl, 2,6-dimethoxycarbonylnaphthalene, 1,4-dichlorocarbonylnaphthalene, 1,5-diphenoxycarbonylnaphthalene and their derivatives having a substituent such as an alkyl, aryl or alkoxy group or a halogen atom at the nucleus. Of these, preferred are terephthalic acid, 4,4'-dicarboxybiphenyl and terephthalic acid dichloride.

Specific examples of the compounds included in Component (C) are hydroquinone, resorcinol, 4,4'-dihydroxybiphenyl, 4,4'-diacetoxybiphenyl, 4,4'-dihydroxybenzophenone, 4,4'-dihydroxydiphenylmethane, 4,4.-dihydroxydiphenylethane, 4,4'-dihydroxydiphenyl ether, 2,2-bis(4-hydroxyphenyl)propane, 4,4'-dihydroxydiphenyl sulfone, 4,4'-dihydroxydiphenyl sulfide, 2,6-dihydroxynaphthalene, 1,4-dihydroxynaphthalene, 1,5-dihydroxynaphthalene, 1,4-diacetoxybenzene, 1,4-diacetoxy-2-methylbenzene, 1,3-diacetoxybenzene, 4,4'-dipropionyloxybiphenyl, 2,6-diformyloxynaphthalene, etc. and their derivatives having a substituent such as an alkyl, aryl or alkoxy group or a halogen atom at the nucleus. Of these, preferred are 4,4'-diacetoxybiphenyl, 2,6-dihydroxynaphthalene and 1,4-diacetoxy-2-methylbenzene.

The aromatic polyester of the present invention is obtained by polycondensing Components (A), (B) and (C) in a polymerization vessel. These Components may be fed to the polymerization vessel in either one lot or divided lots. The reaction may be carried out in an inert gas atmosphere (e.g. nitrogen) under a normal pressure or under reduced pressure. The reaction may be carried out by any of batch process, continuous process and combination thereof.

Prior to the polycondensation, the compounds included in Components (A), (B) and (C) may have been converted to a compound which is more reactive in the Polycondensation, for example by esterification. This modification may be carried out in a vessel other than or in the same vessel as the reaction vessel wherein the polycondensation is to be carried out.

The polycondensation reaction may be carried out by any of the known methods such as suspension polymerization, interfacial polymerization, solution polymerization, bulk polymerization, etc. As the reaction medium used in the polycondensation reaction, various high-boiling solvents, e.g. hydrogenated terphenyl or benzyltoluene, may be used. Of these methods, bulk polymerization with substantially no solvent is preferred, considering after-treatments such as the separation, washing, drying, etc. of the resulting polymer.

The temperature of the polycondensation reaction is 270° to 380° C., preferably 280° to 330° C., more preferably 310° to 320° C. The temperature lower than 270° C. does not satisfactorily accelerate the reaction rate. The temperature higher than 380° C. often causes side reactions such as decomposition, etc. Different reaction temperatures within the above temperature range may be applicable if the reaction is carried out in plural stages. As occasion demands, the aromatic polyester, a reaction product, may be discharged and recovered in a molten state in the course of temperature increase or immediately after the maximum temperature is reached. When the reaction vessel is divided into plural stages or partitioned into many compartments, the reaction temperature in the last stage is the polycondensation temperature referred to in the present invention. Compounds of Ge, Sn, Ti, Sb, Co, Mn, etc. may be used as a catalyst for the polycondensation reaction.

The shape of the reaction vessel may be any of the well-known ones. In the case of vertical-type stirring vessels, multi-stage turbine blades, paddle blades and double helical blades are preferred. In the case of horizontal-type stirring vessels, uniaxial or biaxial stirrers having blades of various shapes (e.g. lens-shaped blades, glasses-like blades, multi-circular flat blades) mounted at right angles to the axis are preferred. Further, twist may be given to the blades in order to improve the stirring efficiency and feed mechanism.

Heating of the reaction vessel is carried out by the use of a heat medium, gas or electric heater. For the purpose of uniform heating, it is also preferable to heat the stirring axis, blade, baffle plate, etc.

The polycondensation time should properly be determined by the reaction conditions, etc. At the reaction temperature in the process of the present invention, the reaction time is usually 0.5 to 5 hours.

In the present invention, it is necessary to continue the polycondensation reaction until the flow temperature of the polyester produced by the reaction reaches 240° C. or higher. Unless the flow temperature is 240° C. or higher, the molecular weight of the obtained polyester does not become high enough, so that the moldability and physical properties of the product become problematic. Further, when polycondensed polyester is subjected to solid-phase polymerization so as to raise the molecular weight, melt-adhesion between the polyester masses is easy to occur, and by-products are easily produced in large amounts, which is not desired in view of cost factor. Lubricants, stabilizers and additives may previously be added to the polycondensation system, so far as a large change is not given to the polymer obtained by the polymerization.

The aromatic polyester thus obtained can be used as it is, but it is preferred to subject the polyester to solid-phase polymerization in order to remove the unreacted materials and improve the physical properties. When the solid-phase polymerization is carried out, it is preferable to mechanically pulverize aromatic polyester obtained by the polycondensation into particles having an average particle diameter of preferably 3 mm or less, more preferably 0.5 mm or less, and then to treat as it is at a temperature of 260° to 350° C. for 1 to 20 hours in an inert gas atmosphere and/or under reduced pressure. When the polymer particles have an average particle diameter of more than 3 mm, between the surface layer and the inner part of the particles are produced differences in polymerization rate, in content of unreacted materials and in diffusion time of by-products newly produced by the solid-phase polymerization. As a result, the molecular weight distribution of the resulting polymer often becomes widened and the unreacted materials to be removed are not removed enough. These phenomena reduce the physical properties of the product. As to the rate of temperature increase and the treatment temperature at the time of the solid-phase polymerization, it will suffice to select them so as not to cause the melt-adhesion between the aromatic polyester particles. The melt-adhesion is not desired because it decreases the surface area of the reaction mass and delays the rate of polycondensation reaction and the removal of low-boiling substances. The solid-phase Polymerization can be carried out effectively at a temperature of 260° to 350° C. which causes no melt-adhesion and in an inert gas atmosphere and/or under reduced pressure. At a temperature below this temperature range, the rate of reaction is slow and much time is required, which is not economical. At a temperature higher than 350° C., decomposition of the polymer takes place, which is not desired. For this polymerization, an inert gas atmosphere and/or reduced pressure is preferred. When a gas leaks into the polymerization system under reduced pressure from the outside, the gas should be an inert gas. The presence of air, particularly oxygen is not desired because the polyester is oxidized to result in a reduction in the physical properties and coloration. The inert gas may be selected from nitrogen, hydrogen, helium, argon and carbon dioxide gas. Ammonia, amines and steam are not preferred because they cause decomposition of the polyester. A period of time necessary for the solid-phase polymerization is usually 1 to 20 hours, preferably 3 to 10 hours at the maximum temperature.

The present invention will be illustrated more specifically with reference to the following examples and comparative examples, but it is not limited to these examples.

The flow temperature of the polyester is the index of melt-flowability. It is measured with a capillary rheometer (Flow Tester CFT-500 produced by Shimadzu Corp.), and expressed by a temperature at which the resin, a test sample, shows a melt viscosity of 48,000 poises when it is melted by heating at a rate of temperature increase of 4° C./min and extruded from a nozzle of 1 mm in internal diameter and 10 mm in length under a load of 100 kg/cm$^2$.

Since the polyesters produced by the present invention are crystalline, there are no solvents which can dissolve them uniformly. Therefore the molecular weight of many of them is difficult to measure. For this reason, the flow temperature is used as the measure of the molecular weight.

The optical anisotropy was measured by heating the resin powder, a test sample, having a particle diameter of 250 $\mu$m or less placed on a heating stage, at a rate of temperature increase of 25° C./min under a polarized light, and macroscopically observing the state of the powder.

The weight loss was measured with a thermobalance (TG-DTA Standard-type produced by Rigaku Denki Co., Ltd.) as follows: About 20 mg of the resin, a test sample, having a particle diameter of 250 $\mu$m or less is heated in the air at a rate of temperature increase of 10° C./min, and a change in weight during the temperature increase is measured with the lapse of time. Further, a temperature at which a percent weight loss to the original weight is 1.0% was obtained from the measurement values obtained above.

The tension test for the molded products was carried out according to ASTM D-638 under the following conditions: Test piece, dumbbell-shaped test piece; number of samples, 6; gauze length, 40 mm; and tensile rate, 5 mm/min.

The heat distortion temperature was measured under a pressure of 18.6 kg/cm$^2$ according to ASTM D-648.

The whiteness of the molded products was measured using a plate-form molded product of 40 mm × 40 mm in size as a test sample and a digital color-difference meter (ND-101-DP produced by Nippon Denshoku Kogyo Co., Ltd.) as a tester. The measurement values obtained were corrected with the whiteness of pure black as 0 and that of pure white as 100 and using the standard of titanium oxide (whiteness, 94.5).

EXAMPLE 1

To a polymerization vessel equipped with a three-stage paddle blade and having a small clearance between the wall of the vessel and the stirring blade, were fed 1,152 g (6.40 moles) of p-acetoxybenzoic acid, 453 g (1.87 moles) of 4,4'-dicarboxybiphenyl and 486 g (1.80 moles) of 4,4'-diacetoxybiphenyl. The molar ratio of Components (A), (B) and (C) fed was 63.6:18.6:17.9, and the molar ratio of Component (B) to Component (C) fed was 104:100. The contents were heated from 200° C. to 320° C. at a temperature increasing rate of 1° C./min with stirring in a nitrogen gas atmosphere and polymerized at 320° C. for 2 hours and 20 minutes.

In this period, acetic acid produced as by-product by the polycondensation reaction was continuously distilled out of the reaction system. The polymer was sampled in the course of the polymerization, and its flow temperature was measured. The flow temperature was 260° C. after 1 hour's polymerization at 320° C., and 282° C. after 2 hours' polymerization at 320° C.

A valve at the bottom of the polymerization vessel was opened to discharge the polyester into a discharge box which was in a nitrogen gas atmosphere. The Polyester could easily be discharged from the vessel in a molten state. The reaction vessel was later disassembled and examined, but adhesion of the polyester to the wall of the vessel and the valve portion was little observed. The yield of the polyester obtained was 1,459 g (99.0% of the theoretical yield).

The discharged polyester was pulverized to particles having an average particle diameter of 1 mm or less on a crusher, and then the flow temperature was measured to find that it was 288° C. Optical anisotropy was observed at a molten state higher than 320° C.

The polyester particles having an average particle diameter of 1 mm or less were fed to a 12-liter stainless steel rotary kiln. In a nitrogen gas atmosphere, the particles were stepwise heated from room temperature to 200° C. in 1 hour and from 200° C. to 270° C. in 4 hours, kept at 270° C. for 3 hours and then discharged. A weight loss at the solid-phase polymerization was 1.2%.

This powdery polymer was insoluble in any of xylene, tetrahydrofuran, chloroform, a phenol/tetrachloroethane (6 : 4 by volume) mixture and m-cresol. The flow temperature of this polymer was 335° C. Wide-angle X-ray diffraction analysis demonstrated that this polymer was crystalline. This polymer showed no weight reduction until 300° C. The temperature at which this polymer showed a percent weight reduction of 1.0% against the original weight was 450° C. The weight loss was only 2% or less even at 500° C.

A mixture of 600 g of this polyester and 400 g of glass fibers having a diameter of 13 μm and an average length of 50 μm (a product of Central Glass Co., Ltd.) could be well granulated into pellets at 350° C. These pellets could be well injection-molded on an injection molding machine (Neo-mat N47/28 produced by Sumitomo Heavy Industries, Ltd.) at a cylinder temperature of 355° C. to obtain test pieces. The test pieces obtained had the following properties: Tensile strength, 1,320 kg/cm$^2$; modulus of elasticity, 7.6 x 10$^4$ kg/cm$^2$; heat distortion temperature, 280° C.; and whiteness, 73.

COMPARATIVE EXAMPLE 1

To the same polymerization vessel as used in Example 1 were fed 1,152 g (6.40 moles) of p-acetoxybenzoic acid, 436 g (1.80 moles) of 4,4'-dicarboxybiphenyl and 491 g (1.82 moles) of 4,4'-diacetoxybiphenyl. The molar ratio of Components (A), (B) and (C) fed was 63.9:18.0:18.2, and the molar ratio of Component (B) to Component (C) was 98.9:100. The contents were heated from 200° C. at a rate of 1° C./min with stirring in a nitrogen gas atmosphere and polymerized under the same conditions as in Example 1. In this period, acetic acid produced as by-product by the polycondensation reaction was continuously distilled out of the reaction system. The reaction was controlled in the same manner as in Example 1. After completion of the polymerization, a valve at the bottom of the polymerization vessel was opened to discharge the polyester into a discharge box in a nitrogen gas atmosphere.

The polyester could easily be discharged from the vessel in a molten state. The reaction vessel was later disassembled and examined, but adhesion of the polyester to the wall of the vessel and the valve portion was little observed. The yield of the polyester obtained was 1,462 g (99.2% of the theoretical yield).

The discharged polyester was pulverized in the same manner as in Example 1, and then the flow temperature was measured to find that it was 290° C. Optical anisotropy was observed in a molten state at temperatures higher than 325° C. Under the same condition as in Example 1, the polyester particles having an average particle diameter of 1 mm or less was subjected to solid-phase polymerization. As a result, the weight loss at the solid-phase polymerization was 1.1% and the flow temperature was 337° C. This polymer was also crystalline and showed no weight loss until 300° C.

The temperature at which this polymer showed a percent weight loss of 1.0% against the original weight was 445° C. The weight loss was only 2% or less even at 500° C.

In the same manner as in Example 1, 600 g of this polyester and 400 g of glass fibers having a diameter of 13 μm and an average length of 50 μm were mixed, granulated and injection-molded. The physical properties of the test pieces obtained were as follows: Tensile strength, 1,210 kg/cm$^2$; modulus of elasticity, 7.2×10$^4$ kg/cm$^2$; heat distortion temperature, 271° C.; and whiteness, 71. As compared with Example 1, the heat distortion temperature lowered by about 9° C.

COMPARATIVE EXAMPLE 2

In Example 1, the polyester was discharged in the same manner as in Example 1 when the polycondensation temperature reached 320° C. The flow temperature of the polyester at that time was 226° C.

This polymer showed a weight loss of 1.7% when it reached 250° C. The temperature at which this polymer showed a percent weight loss of 2.5% against the original weight was 277° C.

This polyester was pulverized to 1 mm or less in size and subjected to solid-phase polymerization with the same equipment and under the same conditions as in Example 1. The whole mass, however, was re-melted, and the molecular weight did not increase to the desired level at the flow temperature was 240° C. Separately from this, the rate of temperature increase was slowed down, i.e. the polyester particles were heated from 200° C. to 270° C. in 12 hours, kept at 270° C. for 3 hours and then discharged. The polyester particles continued to hold a powdery form, there being no melt-adhesion between the particles. However, the weight reduction at this solid-phase polymerization was as large as 6.8%.

The flow temperature of this polyester was 331° C. A mixture of 600 g of the polymer after this treatment and 400 g of glass fibers having a diameter of 13 μm and an average length of 50 μm was granulated at 350° C. The discharge of the strands was problematically unstable as compared with Example 1.

COMPARATIVE EXAMPLE 3

To the same polymerization vessel as used in Example 1 were fed 1,152 g (6.40 moles) of p-acetoxybenzoic acid, 479 g (1.98 moles) of 4,4'-dicarboxybiphenyl and 436 g (1.80 moles) of 4,4'-diacetoxybiphenyl. The molar ratio of Components (A), (B) and (C) fed was 62.9:19.4:17.7, and the molar ratio of Component (B) to Component (C) was 110:100. The contents were heated from 200° C. at a temperature increasing rate of 1° C./min with stirring in a nitrogen gas atmosphere and polymerized under the same conditions as in Example 1. In this period, acetic acid produced as by-product by the polycondensation reaction was continuously distilled out of the reaction system.

The reaction was controlled in the same manner as in Example 1. After completion of the polymerization, a valve at the bottom of the polymerization vessel was opened to discharge the polyester into a discharge box in a nitrogen gas atmosphere.

The polyester could easily be discharged from the vessel in a molten state. The reaction vessel was later disassembled and examined, but adhesion of the polyester to the wall of the vessel and the valve portion was little observed. The yield of the polyester obtained was 1,426 g (96.8% of the theoretical yield), being lower than in Example 1.

The discharged polyester was pulverized in the same manner as in Example 1, and then the flow temperature was measured to find that it was 268° C. Optical anisotropy was observed in a molten state at temperatures higher than 300° C. The polyester particles having an average particle diameter of 1 mm or less was subjected to solid-phase polymerization under the same conditions as in Example 1 except that the temperature was raised at a lower rate than in Example 1. As a result, the weight loss at the solid-phase polymerization was 3.5%, and the flow temperature was 331° C. This polymer was also crystalline, but it showed a weight loss of 0.2% when it reached 300° C. The temperature at which this polymer showed a percent weight loss of 1.0% against the original weight was 400° C., which was lower than in Example 1.

In the same manner as in Example 1, 600 g of this polyester and 400 g of glass fibers having a diameter of 13 μm and an average length of 50 μm were mixed, granulated and injection-molded. Evolution of a gas was observed at the time of granulation and injection molding. The physical properties of the test pieces obtained were as follows: Tensile strength, 980 kg/cm$^2$; modulus of elasticity, 4.9×10$^4$ kg/cm$^2$; heat distortion temperature, 265° C.; and whiteness, 66. As compared with Example 1, the physical properties were inferior.

EXAMPLE 2

In the same manner as in Example 1, 720 g (4.00 moles) of p-acetoxybenzoic acid, 352 g (2.12 moles) of terephthalic acid and 540 g (2.00 moles) of 4,4'-diacetoxybiphenyl were fed to a polymerization vessel and subjected to polycondensation reaction. When the flow temperature of the reactant by sampling reached 286° C (after 2-hour reaction at a polymerization temperature of 320° C.), the contents were discharged. The molar ratio of Components (A), (B) and (C) fed was 49.3:26.1:24.6, and the molar ratio of Component (B) to Component (C) was 106:100. The yield of the pale yellowish brown polyester obtained was 1,101 g (99.0% of the theoretical yield).

This polymer had a flow temperature of 285° C. and was observed to show optical anisotropy in a molten state at temperatures higher than 315° C.

This polyester was pulverized to particles having an average particle diameter of 1 mm or less on a crusher and subjected to solid-phase polymerization with the same equipment and under the same conditions as in Example 1. The weight reduction at the solid-phase polymerization was 0.9%, and the flow temperature was 336° C.

This polymer was insoluble in any of the solvents mentioned in Example 1. Wide-angle X-ray diffraction analysis showed that this polymer was crystalline.

This polymer showed no weight loss until 300° C. The temperature at which this polymer showed a percent weight loss of 1.0% against the original weight was 455° C. The weight loss was only 2% or less even at 500° C.

In the same manner as in Example 1 except that this polymer was used, this polymer and the glass fibers were mixed, granulated and injection-molded at 355° C. In this case, the granulation processability and moldability were good. The test pieces obtained had the following properties: Tensile strength, 1,270 kg/cm$^2$; modulus of elasticity, 7.2×10$^4$ kg/cm$^2$; heat distortion temperature, 290° C.; and whiteness, 70.

COMPARATIVE EXAMPLE 4

To the same polymerization vessel as used in Example 1 were fed 720 g (4.00 moles) of p-acetoxybenzoic acid, 332 g (2.00 moles) of terephthalic acid and 540 g (2.00 moles) of 4.4'-diacetoxybiphenyl and subjected to polycondensation reaction. When the flow temperature of the reactant by sampling reached 286° C. (after 2 hour reaction at a polymerization temperature of 320° C.), the contents were discharged. The molar ratio of Components (A), (B) and (C) fed was 50.0:20.0:20.0, and the molar ratio of Component (B) to Component (C) was 100:100. The yield of the pale yellowish brown polyester obtained was 1,102 g (99.1% of the theoretical yield).

The discharged polyester was pulverized in the same manner as in Example 1, and then the flow temperature was measured to find that it was 290° C. Optical anisotropy was observed in a molten state at temperatures higher than 325° C.

The polyester particles having an average particle diameter of 1 mm or less was subjected to solid-phase polymerization under the same conditions as in Example 1. As a result, the weight loss at the solid-phase polymerization was 1.1%, and the flow temperature was 337° C. This polymer was also crystalline and showed no weight loss until 300° C. The temperature at which this polymer showed a percent weight loss of 1.0% against the original weight was 445° C. The weight loss was only 2% or less even at 500° C.

In the same manner as in Example 1, 600 g of this polyester and 400 g of glass fibers having a diameter of 13 μm and an average length of 50 μm were mixed, granulated and injection-molded. The physical properties of the test pieces thus obtained were as follows: Tensile strength, 1,170 kg/cm2; modulus of elasticity, 6.9×10$^4$ kg/cm2; heat distortion temperature, 279° C.; and whiteness, 70. As compared with Example 1, the heat distortion temperature was low.

EXAMPLE 3

To the same reaction vessel as used in Example 1 were fed 607 g (4.40 moles) of p-hydroxybenzoic acid, 386 g (1.90 moles) of terephthalic acid dichloride and as a reaction medium 1.8 liters of xylene. The mixture was stepwise allowed to react at 120° C. for 1 hour, at 130° C for 1 hour and then at 140° C. for 4 hours while violently stirring in a nitrogen gas atmosphere. Hydrogen chloride produced as by-product by the reaction was neutralized with an aqueous caustic soda solution. The conversion was 92%. Thereafter, 29.9 g (0.18 mole) of terephthalic acid, 320 g (2.00 moles) of 2,6-dihydroxynaphthalene and 510 g (5.00 moles) of acetic acid anhydride were added to the mixture, and acetylation was carried out at 140° C. for 4 hours. The molar ratio of Components (A), (B) and (C) was 51.9:24.5:23.6, and the molar ratio of Component (B) to Component (C) was 104:100.

The reaction mixture was then heated to 320° C. at a rate of temperature increase of 2° C./min while removing xylene, acetic acid anhydride and acetic acid. The polycondensation was carried out substantially without solvents. The contents were sampled when 50 minutes elapsed after the temperature had reached 320° C., and the flow temperature of the contents at that time was 275° C. After 20 minutes, on opening the valve at the bottom of the reaction vessel, the polyester could be discharged without problems. The flow temperature of the discharged polyester was 286° C. The yield of this polyester was 1,100 g (99.3% of the theoretical yield).

This polymer was observed to show optical anisotropy in a molten state at temperatures higher than 330° C., and showed no weight loss until 250° C. The temperature at which this polymer showed a percent weight loss of 2.5% against the original weight was 425° C.

This polyester was pulverized to particles having an average particle diameter of 1 mm or less on a crusher and fed in a thickness of about 10 mm to a stainless steel container. The container was placed in an electric furnace. In a nitrogen gas atmosphere, the temperature was stepwise raised from room temperature to 200° C. in 1 hour, from 200° C. to 270° C. in 2 hours and from 270° C. to 360° C. in 3 hours, kept at 360° C. for 3 hours, and then the polyester was taken out. The weight loss at the solid-phase polymerization was 3.4%. The flow temperature of the polyester obtained was 399° C.

This polymer was insoluble in any of the solvents mentioned in Example 1. Wide-angle X-ray diffraction analysis showed that this polymer was crystalline.

This polymer showed no weight loss until 300° C. The temperature at which this polymer showed a percent weight loss of 1.0% against the original weight was 490° C.

In the same manner as in Example 1 except that this polymer was used, this polymer and the glass fibers were mixed, granulated at 380° C. and injection-molded at 400° C. The granulation processability and moldability were good. The test pieces obtained had the following properties: Tensile strength, 1,180 kg/cm2; modulus of elasticity, 6.1×10$^4$ kg/cm2; heat distortion temperature, 320° C.; and whiteness 71.

COMPARATIVE EXAMPLE 5

Polycondensation reaction was carried out in the same manner as in Example 3 except that the amount of terephthalic acid fed was changed to 16 g (0.10 mole). The molar ratio of Components (A), (B) and (C) fed was 52.4:23.8:23.8, and the molar ratio of Component (B) to (C) was 100:100. The yield of the pale yellowish brown polyester obtained was 1,094 g (98.8% of the theoretical yield).

This polymer had a flow temperature of 285° C. and was observed to show optical anisotropy in a molten state at temperatures higher than 325° C.

This polyester was pulverized to particles having an average particle diameter of 1 mm or less on a crusher and subjected to solid-phase polymerization with the same equipment and under the same conditions as in Example 3. As a result, the weight loss at the solid-phase polymerization was 4.2%, and the flow temperature was 395° C.

This polymer was also crystalline and showed no weight loss until 300° C., but the temperature at which this polymer showed a percent weight loss of 1.0% against the original weight was 480° C., which was lower than in Example 3. In the same manner as in Example 3 except that this polyester was used, this polymer and the glass fibers were mixed, granulated at 375° C. and injection-molded at 395° C. The physical properties of the test pieces obtained were as follows: Tensile strength, 1,110 kg/cm2; modulus of elasticity, 5.7×10$^4$ kg/cm2; heat distortion temperature, 312° C.; and whiteness, 70. As compared with Example 3, the heat distortion temperature was low.

EXAMPLE 4

To the same reaction vessel as used in Example 1 were fed 612 g (3.40 moles) of p-acetoxybenzoic acid, 666 g (2.60 moles) of p-(4-acetoxyphenyl)benzoic acid, 349 g (2.10 moles) of terephthalic acid and 416 g (2.00 moles) of 1,4-diacetoxy-2-methylbenzene. The contents were heated from 200° C. to 310° C. at a rate of temperature increase of 1° C./min with stirring in a nitrogen gas atmosphere and polymerized at 310° C. for 2 hours and 50 minutes. The molar ratio of Components (A), (B) and (C) fed was 59.4:20.8:19.8, and the molar ratio of Component (B) to Component (C) was 105:100.

In this period, acetic acid produced as by-product by the polycondensation reaction was continuously distilled out of the reaction system. The polymer was sampled in the course of the polymerization, and its flow temperature was measured. The flow temperature was 244° C. after 1 hour's polymerization at 310° C., 260° C. after 2 hours' polymerization at 310° C. and 276° C. after 2.5 hours' polymerization at 310° C. Thereafter, a valve at the bottom of the polymerization vessel was opened to discharge the polyester into a discharge box which was in a nitrogen gas atmosphere. The Polyester could easily be discharged in a molten state.

The yield of the polyester was 1,415 g (99.2% of the theoretical yield), and the flow temperature was 281° C.

This polymer was observed to show optical anisotropy in a molten state at temperatures higher than 320° C., and showed no weight loss until 250° C. The temperature at which this polymer showed a percent weight loss of 2.5% against the original weight was 435° C.

This polyester was pulverized to particles having an average particle diameter of 1 mm or less on a crusher and subjected to solid-phase polymerization with the same equipment and under the same conditions as in Example 1. The weight loss at the solid-phase polymerization was 1.5%, and the flow temperature was 337° C.

This polymer was insoluble in any of the solvents mentioned in Example 1. Wide-angle X-ray diffraction analysis showed that this polymer was crystalline.

This polymer showed no weight loss until 300° C. The temperature at which this polymer showed a percent weight loss of 1.0% against the original weight was 480° C. The weight loss was only 2% or less even at 500° C.

In the same manner as in Example 1 except that this polymer was used, this polymer and the glass fibers were mixed, granulated at 345° C. and injection-molded at 350° C. The granulation processability and moldability were good. The test pieces obtained had the following properties: Tensile strength, 1,400 kg/cm$^2$; modulus of elasticity, $8.3 \times 10^4$ kg/cm$^2$; heat distortion temperature, 283° C.; and whiteness, 72.

COMPARATIVE EXAMPLE 6

Polycondensation reaction was carried out in the same manner as in Example 2 except that the amount of terephthalic acid fed was changed to 324 g (1.95 moles). The molar ratio of Components (A), (B) and (C) fed was 60.3:19.6:20.1, and the molar ratio of Component (B) to (C) was 97.5:100. The yield of the pale yellowish brown polyester obtained was 1,396 g (98.8% of the theoretical yield). This polymer had a flow temperature of 281° C. and was observed to show optical anisotropy in a molten state at temperatures higher than 320° C. This polyester was pulverized in the same manner as in Example 4 and subjected to solid-phase polymerization. As a result, the weight loss at the solid-phase polymerization was 2.2%, and the flow temperature was 333° C. In the same manner as in Example 4 except that this polymer was used, this polymer and the glass fibers were mixed, granulated at 345° C. and injection-molded at 350° C. The test pieces obtained had the following properties: Tensile strength, 1,220 kg/cm$^2$; modulus of elasticity, $6.9 \times 10^4$ kg/cm$^2$; heat distortion temperature, 276° C.; and whiteness, 70. The physical properties were inferior as compared with Example 4.

By the process of the present invention, an aromatic polyester superior in the heat resistance and melt-moldability can be produced stably.

The aromatic polyester obtained by the present invention can be used molded into various forms such as fiber, film, etc. In addition, compositions comprising this aromatic polyester and glass fibers, mica, talc, silica, potassium titanate, wollastonite, calcium carbonate, quartz, iron oxide, graphite, carbon fibers, etc. can be used in machine parts, electric and electronic parts and automobile parts because of their excellent mechanical properties, electric properties, chemical resistance and oil resistance.

What is claimed is:

1. A process for producing an aromatic polyester which comprises (1) charging the following components to a vessel,
(A) 30 to 80% by mole of component A consisting of at least one compound having the formula,

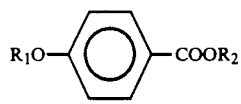

wherein $R_1$ is hydrogen, formyl, acetyl, propionyl or benzoyl, and $R_2$ is hydrogen, a $C_1$-$C_6$ alkyl or a $C_6$-$C_{18}$ aryl, or a mixture of not less than 50% by mole of at least one compound having the formula,

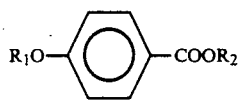

wherein $R_1$ and $R_2$ have the same meanings as defined above, and less than 50% by mole of at least one compound having any one of the formulas,

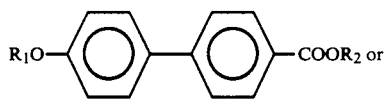

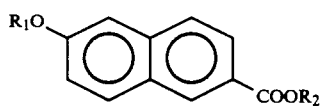

wherein $R_1$ and $R_2$ have the same meaning as defined above, (B) 10 to 35% by mole of component B consisting of at least one compound having any one of the formulas,

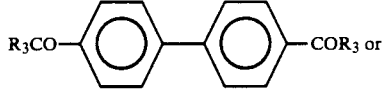

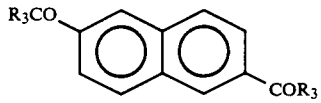

wherein $R_3$ is hydroxyl, a $C_1$-$C_6$ alkyloxy, a $C_6$-$C_{18}$ aryloxy or halogen, or a mixture of not less than 50% by mole of at least one compound having any one of the formulas,

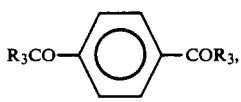

-continued

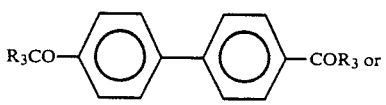

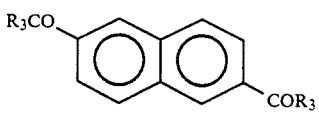

wherein $R_3$ has the same meaning as defined above, and less than 50% by mole of at least one compound having the formula, $R_3CO-Ar-COR_3$ wherein Ar is a divalent aromatic residue, and $R_3$ has the same meaning as defined above, and (C) component C consisting of at least one compound having the formula, $R_4O-A_1-OR_4$ wherein $A_1$ is

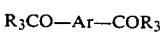

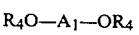

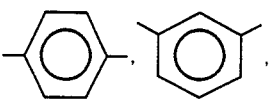

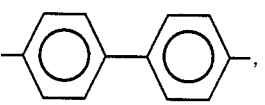

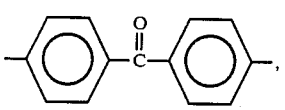

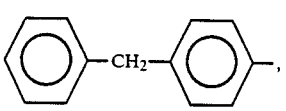

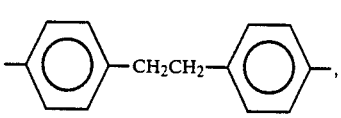

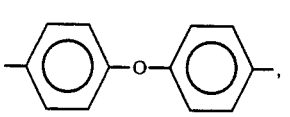

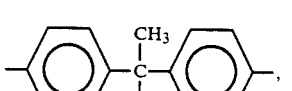

-continued

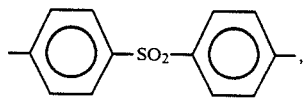

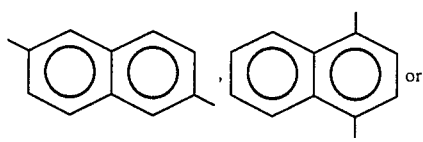

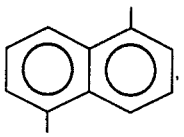

and $R_4$ is hydrogen, formyl, acetyl, propionyl or benzoyl, the molar ratio of component B to component C being 102-108:100, and (2) polycondensing components in the vessel at a temperature of 270° to 380° C. until the flow temperature of the produced aromatic polyester reaches a temperature of 240° C. or higher.

2. A process according to claim 1, wherein the polycondensing is interrupted by discharging the produced aromatic polyester from the vessel in a molten state when the flow temperature of the aromatic polyester reaches a temperature of 240° C. or higher.

3. A process according to claim 2, which is followed by solidifying the discharged polyester and subjecting the solidified polyester to solid-phase polymerization 4. A process according to claim 3, wherein the solidified polyester is pulverized to particles before subjected to solid-phase polymerization.

5. A process according to claim 1, wherein $R_2$ is a member selected from the group consisting of hydrogen, methyl, ethyl, propyl, phenyl and benzyl.

6. A process according to claim 1, wherein $R_3$ is a member selected from the group consisting of hydroxyl, methoxy, chloro or phenyloxy and Ar is a member selected from the group consisting of

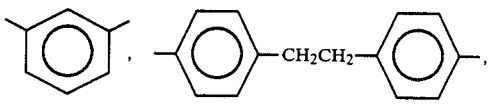

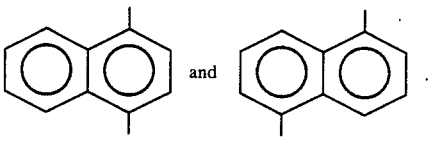

7. A process according to claim 3, wherein the solid-phase polymerization is subjected to an atmospheric condition selected from the group consisting of a normalized pressure inert gas atmosphere, a reduced pressure inert gas atmosphere, and a pure reduced pressure atmosphere.

* * * * *